(12) United States Patent
Maleev et al.

(10) Patent No.: US 12,529,655 B2
(45) Date of Patent: Jan. 20, 2026

(54) BROOM CAMERA AND ROTATIONAL STAGE FOR METROLOGY MEASUREMENTS

(71) Applicant: Tokyo Electron Limited, Tokyo (JP)

(72) Inventors: Ivan Maleev, Fremont, CA (US); Andrej Mitrovic, Chandler, AZ (US)

(73) Assignee: Tokyo Electron Limited, Tokyo (JP)

( * ) Notice: Subject to any disclaimer, the term of this patent is extended or adjusted under 35 U.S.C. 154(b) by 96 days.

(21) Appl. No.: 18/647,370

(22) Filed: Apr. 26, 2024

(65) Prior Publication Data

US 2025/0334516 A1 Oct. 30, 2025

(51) Int. Cl.
*G01N 21/55* (2014.01)
*G01B 11/06* (2006.01)
*G01N 21/31* (2006.01)

(52) U.S. Cl.
CPC ............. *G01N 21/55* (2013.01); *G01B 11/06* (2013.01); *G01N 21/31* (2013.01)

(58) Field of Classification Search
CPC ......... G01N 21/55; G01N 21/31; G01B 11/06
See application file for complete search history.

(56) References Cited

U.S. PATENT DOCUMENTS

| | | | |
|---|---|---|---|
| 9,182,341 B2 | 11/2015 | Maleev | |
| 11,309,202 B2 | 4/2022 | Krishnan et al. | |
| 2016/0148963 A1* | 5/2016 | Creazzo | G02B 5/284 257/432 |
| 2021/0207951 A1* | 7/2021 | Carcasi | G01B 11/0633 |
| 2022/0139743 A1 | 5/2022 | Maleev et al. | |
| 2022/0334054 A1* | 10/2022 | Brogger | B42D 25/382 |
| 2023/0384156 A1* | 11/2023 | Gazes | G01J 3/021 |

FOREIGN PATENT DOCUMENTS

| | | | |
|---|---|---|---|
| CN | 111916366 A | | 11/2020 |
| JP | 2004-12302 A | | 1/2004 |
| JP | 2004012302 A | * | 1/2004 |
| JP | 2005-17211 A | | 1/2005 |
| JP | 2005017211 A | * | 1/2005 |
| JP | 2017-146288 A | | 8/2017 |

OTHER PUBLICATIONS

English machine translation of JP2004012302A (Year: 2004).*
English machine translation of JP2005017211A (Year: 2005).*
International Search Report and Written Opinion issued May 23, 2025, in PCT/US2025/016294 (with English Translation), 11 pages.

* cited by examiner

*Primary Examiner* — Dominic J Bologna
(74) *Attorney, Agent, or Firm* — Oblon, McClelland, Maier & Neustadt, L.L.P.

(57) ABSTRACT

A method of measuring thin-film thickness, overlay, and wafer-to-wafer bonding overlay, including providing a substrate on a handling stage configured for rotation; illuminating the substrate with a broadband illumination beam; obtaining a first set of reflectivity spectra of a first linear region of the substrate via a hyperspectral broom camera; incrementally rotating the substrate by an angle of rotation via the handling stage; obtaining a set of reflectivity spectra of a linear region of the substrate via the hyperspectral broom camera after each incremental rotation; and determining a thickness distribution of the substrate based on sets of reflectivity spectra obtained by the hyperspectral broom camera, wherein each set of reflectivity spectra includes individual intensities of a plurality of wavelengths of light.

20 Claims, 6 Drawing Sheets

BROOM CAMERA AND ROTATIONAL STAGE FOR METROLOGY MEASUREMENTS

BACKGROUND

Technical Field

The present disclosure relates to a metrology apparatus and method of semiconductor measurement.

Description of the Related Art

Optical metrology is a critical part of the semiconductor manufacturing process. Spectroscopic imagers can be used to measure and characterize semiconductor wafer samples at varying throughputs and with varying amounts of data acquisition.

SUMMARY

In one embodiment, the present disclosure is directed to a method of measuring thin-film thickness, overlay, and wafer-to-wafer bonding overlay, comprising providing a substrate on a handling stage configured for rotation; illuminating the substrate with a broadband illumination beam; obtaining a first set of reflectivity spectra of a first linear region of the substrate via a hyperspectral broom camera; incrementally rotating the substrate by an angle of rotation via the handling stage; obtaining a set of reflectivity spectra of a linear region of the substrate via the hyperspectral broom camera after each incremental rotation; and determining a thickness distribution of the substrate based on sets of reflectivity spectra obtained by the hyperspectral broom camera, wherein each set of reflectivity spectra includes individual intensities of a plurality of wavelengths of light.

In one embodiment, the present disclosure is directed to a method of measuring thin-film thickness, overlay, and wafer-to-wafer bonding overlay, comprising: providing a substrate on a handling stage configured for rotation; illuminating the substrate with a broadband illumination beam; obtaining a first set of reflectivity spectra of a first linear region of the substrate via a hyperspectral broom camera; incrementally rotating the substrate by an angle of rotation via the handling stage; incrementally translating the substrate in a first direction and a second direction relative to the hyperspectral broom camera, the first direction and the second direction being perpendicular and in a plane of the substrate; obtaining a set of reflectivity spectra of a linear region of the substrate via the hyperspectral broom camera after each incremental rotation and translation; and determining a thickness distribution of the substrate based on sets of reflectivity spectra obtained by the hyperspectral broom camera, wherein each set of reflectivity spectra includes individual intensities of a plurality of wavelengths of light.

In one embodiment, the present disclosure is directed to an apparatus, comprising: a handling stage configured to receive a substrate and to rotate; a light source configured to emit a broadband illumination beam; optics configured to guide the broadband illumination beam to the substrate and guide a reflected beam from the substrate to an optical detector, the optical detector being configured to obtain a set of reflectivity spectra from the substrate based on the reflected beam; and a controller configured to: obtain a first set of reflectivity spectra of a first linear region of the substrate via the optical detector, incrementally rotate the substrate by an angle of rotation via the handling stage, obtain a set of reflectivity spectra of a linear region of the substrate via the optical detector after each incremental rotation, and determine a thickness distribution of the substrate based on sets of reflectivity spectra obtained by the optical detector, wherein each set of reflectivity spectra includes individual intensities of a plurality of wavelengths of light.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
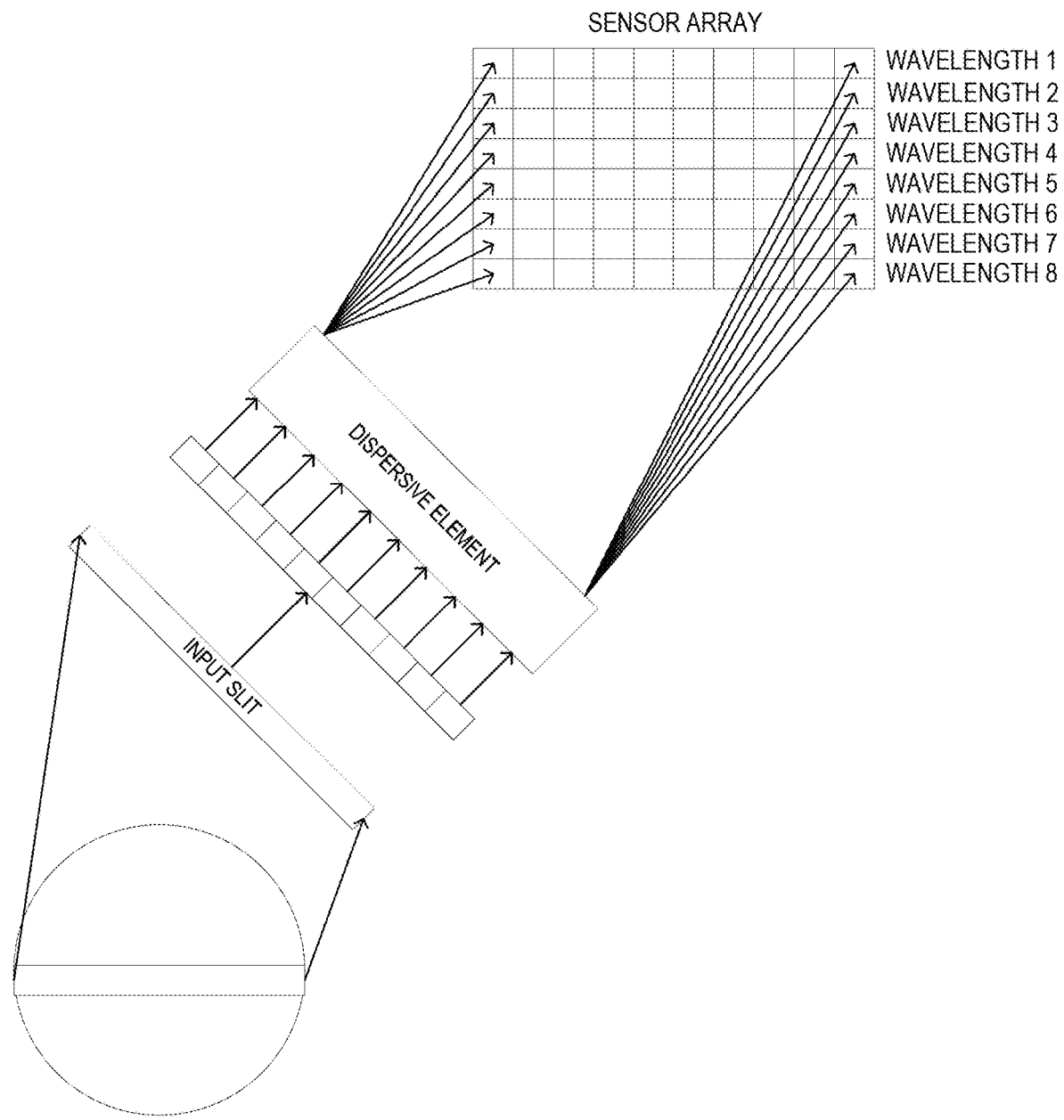
FIG. 1 is a schematic of a hyperspectral broom camera, according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The order of discussion of the different steps as described herein has been presented for clarity's sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

In the drawings, like reference numerals designate identical or corresponding parts throughout the several views. Additionally, as used herein, the words "a", "an" and the like generally carry a meaning of "one or more", unless stated otherwise.

Furthermore, the terms, "approximately", "approximate", "about" and similar terms generally refer to ranges that include the identified value within a margin of 20%, 10%, or preferably 5%, and any values therebetween.

In one embodiment, the present disclosure is directed to systems and methods for acquiring multi-point optical metrology data. The optical metrology data can include spectral data (e.g., hyperspectral data) and can be used to characterize a substrate. For example, the spectral data can be used to determine a film thickness (e.g., distribution or uniformity of thin-film thickness), a critical dimension, alignment and overlay of layers, the presence of defects, etc. It can be appreciated that the characterization of a substrate can include any type of feature analysis, material analysis, analysis for subsequent processing, etc. In one embodiment, the multi-point data acquisition as described herein can improve imaging throughput while increasing the number of points on a substrate that are measured in a scan, resulting in more accurate and useful assessment. For example, the systems and methods described herein can be used to generate a full map of critical dimensions of a wafer.

In one example, the systems and methods described herein can be used to determine film thickness of a substrate based on the spectral reflectivity of a layer of the substrate. For example, the absorption of light of a layer of a substrate can be dependent on a wavelength of the light. When a thin film (e.g., the top Si layer) is illuminated with broadband illumination, reflectivity spectra exhibit a characteristic periodicity due to constructive and destructive interference affecting the wavelengths of the illumination beam differently as they traverse the thin film, reflect from a bottom surface, and traverse the thin film back towards the top surface. Semiconductor materials, such as Si, absorb a portion of the incoming broadband illumination, and light transparency generally increases with wavelength such that there is little absorption in the infrared (IR) part of the spectrum.

Thus, because of the wavelength dependence of absorption in Si, it is expected that there would exist a portion of the reflectivity spectrum where absorption is sufficiently high, and therefore the reflectivity spectrum of a top Si layer with underlying features will substantially match a reflectivity spectrum of an identical Si layer without any underlying structures or any other films formed thereunder. Conversely, for wavelengths outside of this portion of the reflectivity spectrum, said spectrum would differ due to lack of sufficient attenuation, and exhibit the periodicity characteristic of thin film reflectivity spectra. This periodicity may potentially be further altered by the underlying structures diffracting a portion of the illumination beam at still longer wavelengths, thus altering the periodicity characteristic of a thin film alone.

In one embodiment, the present disclosure is directed to systems and methods of multi-point optical metrology using a hyperspectral broom camera. A broom camera can image an object by scanning the object in a first direction while acquiring spectral data across a second direction. The second direction can be perpendicular to the first direction. For example, a broom camera can include a one-dimensional array of spectroscopic sensors arranged in a row. Each sensor can correspond to a pixel in a resulting image. The broom camera can capture spectroscopic data across a linear (e.g., horizontal) segment or linear region of the object in a single acquisition. A linear region can be defined as a region (area) having a length that is greater than a width. The broom camera can capture an entire image by scanning an object in a vertical direction perpendicular to the horizontal row of spectroscopic sensors in the plane of the sensors. The camera or the object itself can move in order to achieve the relative movement between the camera and the object. In this manner, the spectroscopic sensors capture new rows of spectroscopic data from horizontal segments until the entire object is imaged.

In one embodiment, a hyperspectral broom camera can include a dispersive optical element. The dispersive element can spread incoming light from a single point in a row into individual wavelength spectra. In one embodiment, a hyperspectral broom camera can include a two-dimensional sensor array arranged in a grid. Each row of the grid can include sensors for the same wavelength. Different rows can correspond to different wavelengths. Each wavelength of an incoming point of light can be directed to the appropriate spectroscopic sensor in a column of sensors corresponding to the point. This dispersion and detection can be performed for each point in a linear region, resulting in a two-dimensional array of spectroscopic data for a one-dimensional array (row) of pixels. In this manner, spectral data can be acquired for each horizontal segment of an object. Each column of spectroscopic sensors can be used to determine the intensities of individual wavelength spectra received from a single point on the object. The process can be repeated as the hyperspectral broom camera scans the object in a direction perpendicular to the row to capture segments of the object.

FIG. 1 is an illustration of the passage of light through a hyperspectral broom camera according to one embodiment. In one embodiment, light can enter the camera via an input slit. A thinner input slit can result in more accurate spectral measurements. The light can be reflected from a linear region of a sample. Light can be dispersed into individual spectra via a dispersive element. The individual spectra can then be directed to the appropriate sensor in a two-dimensional array of sensors. The column of the spectra corresponds to the location in the linear region. The row of the spectra corresponds to the wavelength. For illustrative purposes, the individual spectra of the first pixel and the last pixel of the row are illustrated. In this manner, a hyperspectral broom camera can acquire spectral data with spatial resolution in a first dimension (the rows of the array) and with wavelength resolution in a second dimension (the columns of the array).

Figure 2:
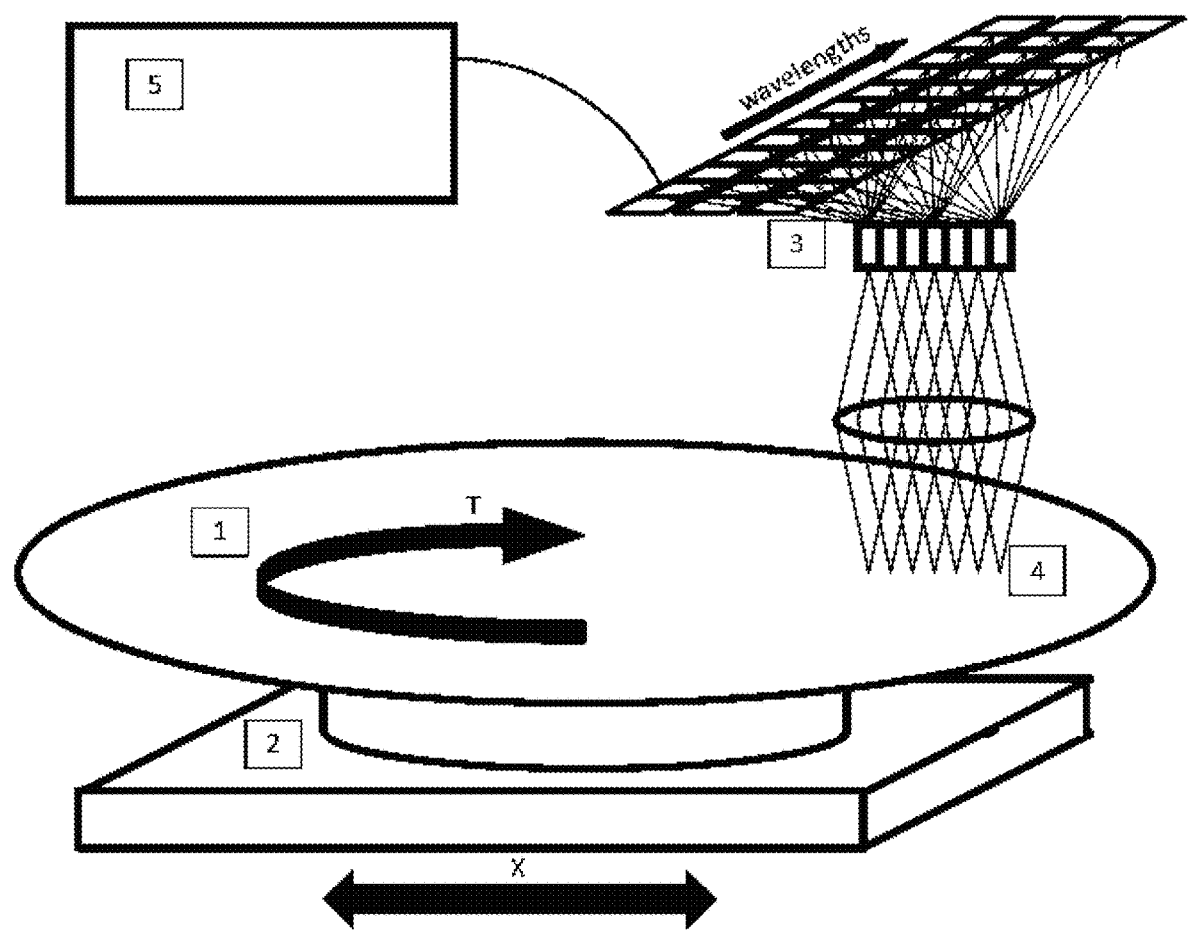
FIG. 2 is a schematic of a system, according to one embodiment of the present disclosure.

In one embodiment, a hyperspectral broom camera can be used to acquire spectral data over two spatial dimensions. The two spatial dimensions can correspond to a full scan of a substrate surface and/or layers. FIG. 2 is a schematic of a metrology system, according to one embodiment of the present disclosure. The system can include a sample handling stage 2 configured to receive a sample 1. In one example, the sample 1 can be a wafer. The handling stage 2 can be configured for rotational and/or translational movement. The translation movement can be in at least one dimension but is not limited to a single dimension. The system can further include an optical detector 5. The optical detector can be a hyperspectral broom camera as described with reference to FIG. 1. The hyperspectral broom camera can be used to acquire spectral data from a segment 4 of the wafer. The segment 4 can be a line (e.g., a row) across the wafer. Input light 3 from the segment can be input to the camera. At each point in the line 3 (e.g., each pixel), the light can be dispersed into one or more wavelength spectra. Each wavelength spectra for the point can be directed to an individual sensor corresponding to the wavelength. The hyperspectral broom camera 5 can thereby acquire multiple columns of data for each row segment 4 acquired in a single "snapshot" of the wafer.

Figure 3A:
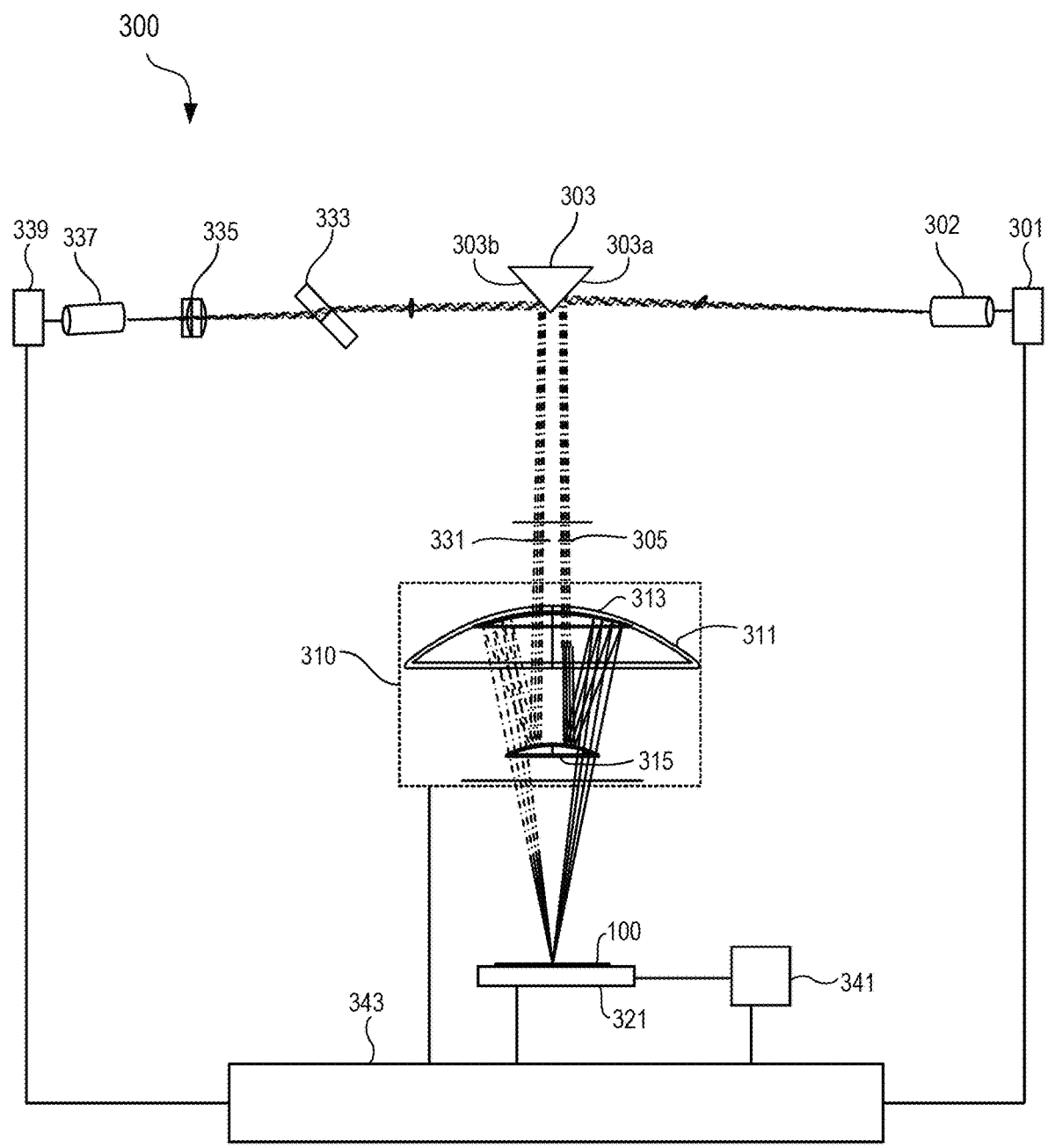
FIG. 3A is a schematic of an apparatus, according to one embodiment of the present disclosure.
Figure 3B:
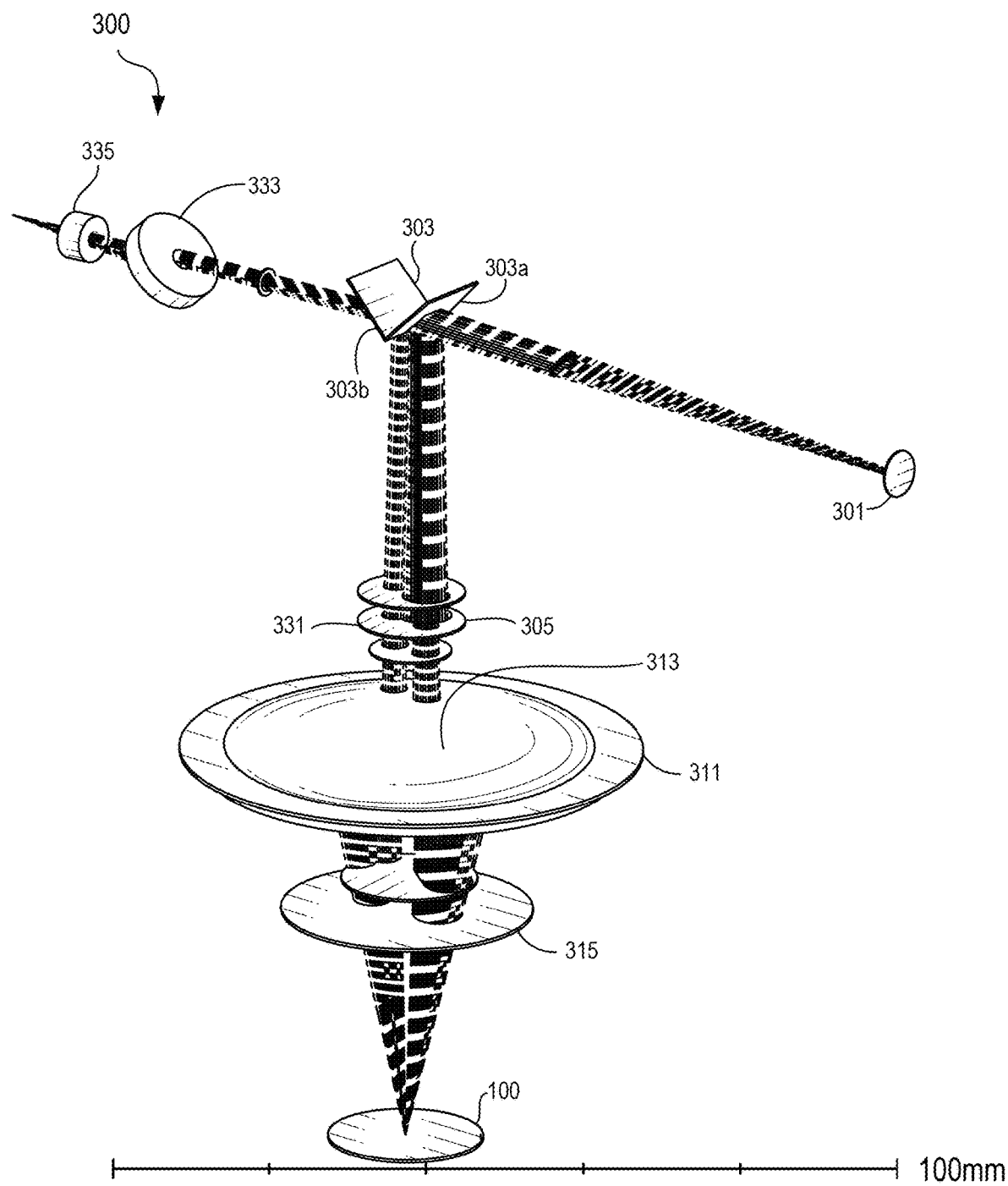
FIG. 3B is a perspective view schematic of an apparatus, according to one embodiment of the present disclosure.

FIG. 3A and FIG. 3B respectively show a schematic view and a perspective view of a system 300 of the present disclosure. The system 300 can include some or all of the components of the system of FIG. 2. As shown, the system 300 includes a handling stage 321 configured to receive the sample 100. A light source 301 is configured to emit a broadband illumination beam for the sample 100. In one embodiment, the sample 100 can include structures on a surface of the sample 100. In one embodiment, the sample 100 can include a top layer formed on top of the structures.

Optics are configured to guide the broadband illumination beam to illuminate the sample 100, collect a reflected beam from the sample 100, and guide the reflected beam to an optical detector 339. Specifically, the optics can include an illumination optical fiber 302 so that the light source 301 and the illumination optical fiber 302 can function as a fiber illuminator. The optics can also include a knife edge prism (KEP) 303 having a first side 303a and a second side 303b. The optics can further include a Schwarzschild objective 310 including a primary mirror 311 and a secondary mirror 315.

In one embodiment, the primary mirror 311 can have a larger dimension than the secondary mirror 315. The primary mirror 311 has an aperture 313 (e.g., a central aperture) so that the broadband illumination beam can be directed by the first side 303a of the KEP 303 to go through the aperture 313 of the primary mirror 311 to the secondary mirror 315. The secondary mirror 315 then reflects the broadband illumination beam to the primary mirror 311 which then reflects the broadband illumination beam to the sample 100. Subsequently, a reflected beam from the sample 100 is received by the primary mirror 311 and reflected to the secondary mirror 315. Next, the reflected beam is reflected by the secondary mirror 315 to go through the aperture 313 of the primary mirror 311 to the second side 303b of the KEP 303 which can then direct the reflected beam to the optical detector 339.

In a non-limiting example, the apparatus 300 can be configured as a spectroscopic reflectometer such as an absorption spectroscopic reflectometer (aSR). A broadband light source spanning ultraviolet (UV), visible (VIS), and near-infrared (NIR) portions of the light spectrum may be used. For example, a wavelength range of 200 to 1000 nm may be used. For certain applications, it may be necessary to extend the wavelength range further into the vacuum ultraviolet (VUV) and infrared (IR) parts of the light spectrum, to accommodate thin or thick films, or films with lower- or higher-than-usual absorption. In other words, the light source 301 may be configured to generate the broadband illumination beam with a wavelength range defined by a lower limit and an upper limit. The lower limit can be 0.1 nm, 1 nm, 10 nm, 100 nm, 200 nm, 300 nm, 400 nm, 500 nm, 600 nm, 700 nm, 800 nm or any values therebetween. The upper limit can be 25,000 nm, 15,000 nm, 3,000 nm, 1,000 nm, 900 nm, 800 nm, 700 nm, 600 nm, 500 nm, 400 nm, 300 nm, 200 nm, 100 nm or any values therebetween. In one embodiment, the wavelengths, wavelength range, and/or wavelength resolution of the broadband illumination beam can be modified. The wavelengths of the broadband illumination beam can be set via a controller based on the sample or the optical detector 339. In one example, a hyperspectral wavelength range can be between approximately 250 nm to 15000 nm.

In one embodiment, the light source 301 includes a laser-driven xenon (Xe) light source (LDLS), a laser, a laser diode, a light emitting diode, a gas discharge light source, a laser-driven light source, or any combination thereof. The light source 301 may include any suitable combination of lasers, LEDs, gas discharge light sources, etc. Preferably, the light source 301 includes an LDLS. The light source 301 may be continuous (CW) or pulsed. The broadband illumination beam is guided to the sample 100 by illumination optics which may include an optical fiber (e.g., 302) to allow remote installation of the light source 301, a system stop 305, and a focusing lens (e.g., 310). The purpose of the focusing optics is to focus the illumination beam onto the sample 100, with an incident angle between 0° (normal incidence) and 85°, e.g., 0°, 5°, 10°, 20°, 30°, 40°, 45°, 50°, 60°, 70°, 80°, 85° and any values therebetween. Focusing optics may include a Schwartzschild objective (e.g., 310), which uses reflective optics (e.g., 311 and 315) to focus the illumination beam. Suitable masks may be used to allow the selection of incident angle ranges for illumination or modulation of intensity levels of portions of the illumination beam with different incident angles. Upon reflection and/or refraction from the sample 100, the reflected beam is formed that is captured by and transmitted by collection optics to the optical detector 339. The KEP 303 may be used to steer the illumination beam to the focusing optics (e.g., 310) and steer the reflected beam from the focusing optics (e.g., 310). The use of suitable masks allows collection of the specular reflection from the sample 100, as well as scattered light in predefined reflection angle ranges. In one embodiment, the KEP 303 can be implemented in the form of two mirrors as shown in FIG. 3B.

In one embodiment, the fiber illuminator (e.g., 302 and 301) of the illumination optics is imaged via focusing optics and collection optics onto a broadband high-resolution spectrometer (e.g., 339), for measuring spectral reflectivity. The spectrometer (e.g., 339) can be a hyperspectral broom camera. The detection optics may include a system stop aperture (e.g., 331) and a collection lens (e.g., 335) for focusing the reflected beam onto an input slit or optical fiber (e.g., 337) of the spectrometer (e.g., 339). The detection optics may also include a beam splitter 333.

In one embodiment, the spectrometer (e.g., 339) can be a hyperspectral broom camera having a two-dimensional array of spectroscopic sensors. The spectrometer can separate light along one dimension into individual spectra in order to generate a two-dimensional array (set) of spectral data. In one embodiment, the spectrometer can have an input slit through which light is input to the spectrometer. The input slit can be approximately 1 micron to approximately 150 microns wide and can have a length that is greater than a width. The spectrometer can further include a collimator, e.g., a curved mirror or lens. The collimator can direct light from the input slit to one or more dispersive elements. The light passing through the collimator can be aligned on an optical axis. The dispersive element (e.g., a prism or diffraction grating) can separate or spread the input light into individual spectra. In one embodiment, the dispersive element can spread the light along an axis perpendicular to the input slit. For example, the input slit can be a horizontal line. Input light that passes through the horizontal line can be reflected from a linear region of a sample. The dispersive element can separate the input light at each point on the horizontal line into individual spectra that are vertically arranged. Each spectrum can then be directed into the appropriate spectroscopic sensor of the spectrometer based on wavelength to generate the set of spectral data. The spectral data can also be referred to as reflectivity spectra.

The collection optics may further include at least one polarizer to form a polarized reflected beam, if desired. For variation of the polarization orientation, a movable or rotatable polarizer may be used. Polarization can improve measurement performance when a surface of the sample 100 is not entirely smooth, due to e.g., roughness, grinding marks, etc. Polarization can also improve measurements when the sample includes underlying structures that are highly anisotropic, or when measurements are made of wafers with substantial surface roughness. The collection beam may be linearly polarized, circularly polarized, etc. In one embodiment, a polarizer may be part of the illumination optics, for example inserted into the illumination beam or integrated into the light source 301. An additional advantage of using a polarizer is that it allows the determination of the critical wavelength (CWL) as the lower bound of the periodic portion of the reflectivity spectrum, as a point where the ratio of reflectivities acquired at orthogonal polarizations deviates from unity. This allows a non-computationally intensive removal of the nonperiodic portion of the reflectivity spectra below the CWL, which can be used to determining a Fourier Transform (FT) peak with improved accuracy.

In one embodiment, the optical detector can be further configured with multiple polarizing elements of different polarizations in order to reconstitute information about a polarization tensor over a sample. Groups of neighboring pixels (e.g., sensors) in the optical detector can receive light of substantially different polarization states. An example of a polarization tensor can be modeled as Jones matrices or Mueller matrices. The polarized light via multiple polarizing elements can be sufficient to reconstitute information about polarization tensors, rather than just single linear polarization. In one embodiment, the spatial resolution of an optical detector can be utilized for polarization data. For example, a 2D array of sensors can be divided into groups of 4 pixels (e.g., a 2×2 square). Different pixels within each group can receive light of different polarizations. As an example, the polarizations can differ by 45° with respect to each other using linear polarizers, for example 0°, 45°, 90°, 135°. Alternatively or additionally, circular polarizers can be used to encode additional polarization information. Analysis of received polarization information from each group allows for extraction of either Jones or Mueller matrix elements, and therefore provides enhanced sensitivity to sample characteristics or parameters of interest, such as thin film thickness.

Illumination and reflected beams may have planar or circular wavefronts. In one embodiment, phase masks disposed within the illumination beam path, or reflected beam path, or both, can be used to modulate the beams across ranges of angles of incidence and reflection. For example, a 2Pi phase mask placed into the illumination beam could be used to form a circular beam with a helical wavefront. Such a beam contains an optical singularity which could advantageously be used to achieve an optimal optical power distribution on the sample 100, e.g., at layer interfaces of the sample. Additionally, as one skilled in the art would understand, a reference channel on the spectrometer (e.g., 339) may be employed to monitor the output of the light source 301, so variation in light output can be factored out of measured reflectivity spectra.

In an embodiment, the apparatus 300 is mounted on a platform which can be integrated with a wafer processing module 341. The platform may include a wafer loading apparatus and a wafer handling stage (e.g., 321) that can move and position the semiconductor wafer with respect to an optical apparatus in a way that the optical apparatus can perform multiple sequential measurements over a large portion of the wafer. The wafer handling stage may have rotational and translational degrees of freedom enabling measurements over at least 95% of the wafer surface with approximately uniform wafer coverage. Various sampling and scanning patterns may be utilized, depending on the degrees of freedom of the wafer handling stage (e.g., 321) and degrees of freedom of motion of the optical apparatus (if so equipped), such as measurements on an X-Y grid, R-θ, polar grid, etc.

In one embodiment, the handling stage 321 can be configured for rotational movement, translational movement, or a combination of rotational and translational movement. The handling stage 321 can be an X-Y, X-Y-Z, R-θ, R-θ-Z stage, or any combination thereof. In one embodiment, the field of view (FOV) of the spectrometer (e.g., a hyperspectral broom camera) having an input slit can be a linear region of the sample 100. The handling stage 321 can move the sample 100 (e.g., a wafer) and enable measurement (sampling) of a number of linear regions of the sample 100 by the hyperspectral broom camera. In one embodiment, the combination of rotational and translational movement of the handling stage 321 can result in a comprehensive scan of the sample 100.

It can be appreciated that movement of the sample 100, as described herein, can refer to movement of the sample 100 relative to the spectrometer. Relative movement of the sample and the spectrometer can be accomplished by movement of the sample and/or the spectrometer (e.g., 339). For example, the sample can be stationary while the spectrometer moves. In one embodiment, the spectrometer can be mounted on a spectrometer handling stage. In one embodiment, the spectrometer handling stage can be a linear stage configured for translation in at least one direction (X, X-Y, X-Y-Z) or any combination of directions. In one embodiment, the spectrometer can be translated while the sample 100 is stationary to achieve a desired scan pattern. In one embodiment, the sample 100 can be rotated by the handling stage and the spectrometer can be translated by the linear stage to achieve a combination of movements for a scan pattern. In one embodiment, the spectrometer and the sample can both be translated to achieve a combination of movements for a scan pattern.

Figure 4A:
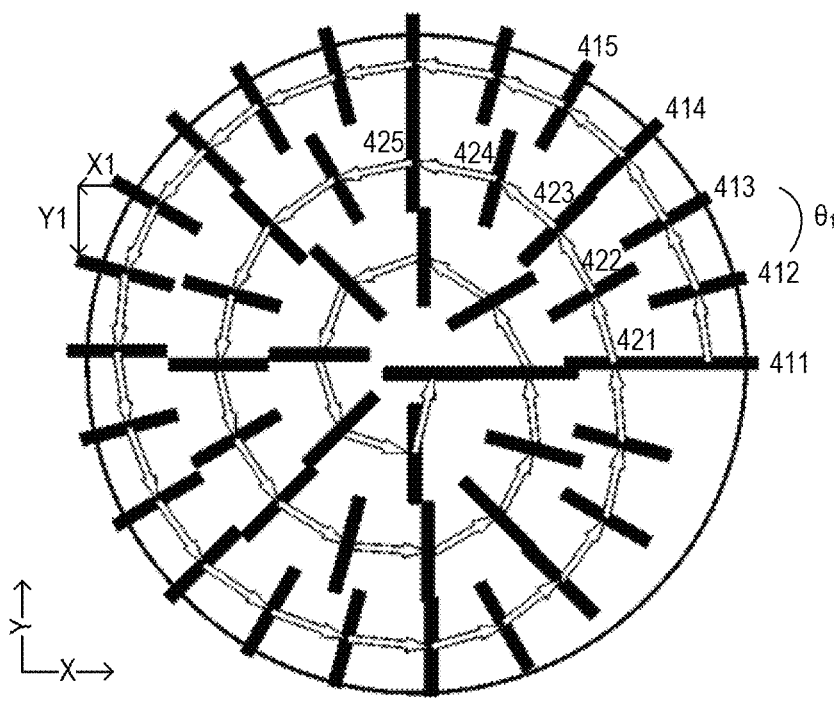
FIG. 4A is a wafer scan pattern, according to one embodiment of the present disclosure.

FIG. 4A is an example of a wafer scan pattern, according to one embodiment of the present disclosure. The wafer 400 can be provided on a wafer handling stage (e.g., 321). Each linear segment 411, 412, 413, etc. can correspond to a linear region of the wafer that is imaged by the hyperspectral broom camera in a single acquisition. Advantageously, the FOV of the hyperspectral broom camera can be a linear region rather than a single point, thereby enabling more efficient data acquisition. In one embodiment, the wafer can be rotated and translated by the wafer handling stage during a scan so that the hyperspectral broom camera can acquire light from different regions of the wafer.

FIG. 4A illustrates a spiral scan pattern wherein the wafer is rotated and translated during the scan. In one embodiment, a first array (set) of spectral data of a first linear region 411 at the edge of the wafer can be acquired. In one embodiment, the length of the linear region can be less than a radius of the wafer. The wafer can then be rotated by an angle $\theta_1$. In one embodiment, the angle of rotation $\theta_1$ can be set based on parameters of the system, the sample, and/or the scan. The parameters can include, but are not limited to, a size of the wafer, the sensor array of the hyperspectral broom camera, the collection optics, and a set number of acquisition points. For example, a larger angle of rotation can result in a faster scan and fewer total acquisition points. In one example, the total number of acquisition points can depend on the features of the wafer (e.g., the critical dimensions of features) or a type of characterization or metrology.

In one embodiment, the wafer can be translated in addition to being rotated by the angle $\theta_1$. For example, the wafer can be linearly translated in the X-direction by a distance X1 and in the Y-direction by a distance Y1. The linear region 412 can then be imaged by the spectrometer. The wafer can continue to be rotated by the angle $\theta_1$ and translated by X1, Y1 so that subsequently imaged linear regions 413, 414, 415, etc. follow a spiral pattern. The combination of rotation and translation results in each linear region being oriented radially while moving inward in the spiral pattern toward the center of the wafer. For example, after a full rotation, the wafer can be in a position where linear region 421, which is laterally displaced from linear region 411, is imaged by the spectrometer. The wafer can continue being rotated and translated so that subsequent linear regions 422, 423, 424, 425, etc. can be imaged in the spiral pattern. In one embodiment, the translation of the wafer can follow a circular path.

Figure 4B:
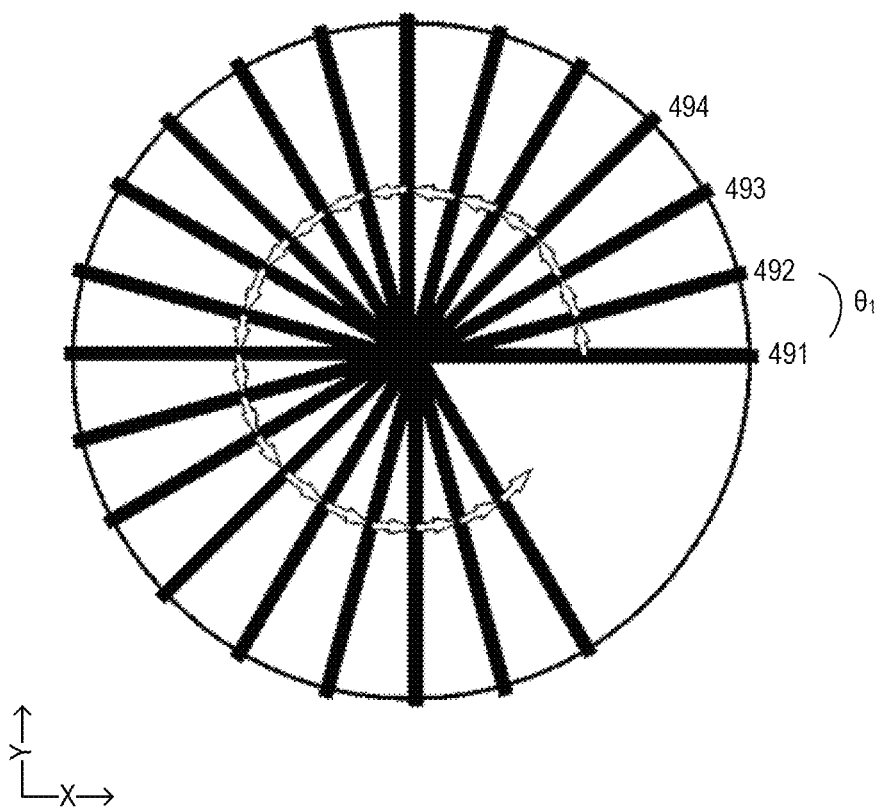
FIG. 4B is a wafer scan pattern, according to one embodiment of the present disclosure.

FIG. 4B illustrates a rotational scan pattern wherein the wafer is rotated during the scan. A first array (set) of spectral data of a first linear region 491 on the wafer can be acquired. In one embodiment, the length of the linear region can be approximately the radius of the wafer. In one embodiment, the length of the linear region can be modified by changing the magnification of the collection optics. The wafer can be rotated by an angle $\theta_1$ so that a second linear region 492 is imaged by the hyperspectral broom camera, followed by a third linear region 493, fourth linear region 494, etc. Each linear region can span from the center of the wafer to the edge of the wafer. Each linear region can approximate a slice of the wafer. In this manner, the wafer can be scanned in a single rotation. The angle of rotation $\theta_1$ can be set based on the parameters of the system, the sample, and/or the scan.

It can be appreciated that the scan patterns illustrated in FIGS. 4A and 4B are presented as non-limiting examples of the methods described herein. Alternative scan patterns can include pure translation, pure rotation, or combinations of rotation and translation. In one embodiment, scan patterns can be combined to increase the number of measurement points. For example, a scan pattern can include two spirals. The first spiral can start at a position at the edge of the wafer and can move inwards toward the center of the wafer. In one embodiment, the wafer can be translated in at least one direction. A second spiral can then start at the center of the wafer and can move outwards toward the edge of the wafer. The positions of the wafer in each spiral may not fully overlap. The angle of rotation for each spiral can be the same or different. Similarly, the translation of the wafer in each spiral can be the same or different.

In one embodiment, the scan pattern can include concentric circles. For example, the wafer can be incrementally rotated by an angle of rotation $\theta_1$ in a first full circle without translation during imaging. The length of the linear regions imaged at each position of the wafer can be shorter than the radius of the wafer. The wafer can then be translated in one direction (e.g., X) after a full rotation. The wafer can then be imaged while being incrementally rotated by the angle of rotation $\theta_1$ in a second full circle without translation. The second full circle can be inside and concentric with the first full circle. The process of translation and full rotation can be repeated.

In one embodiment, the scan pattern can include a magnification of the optical detector between the wafer and the spectrometer. In one embodiment, the magnification between the wafer and the spectrometer can be modified to set the FOV of the hyperspectral broom camera. For example, the magnification between the wafer and the spectrometer can be set so that the linear region can span a diameter of a wafer. In one embodiment, the wafer can be scanned via a 180° rotation rather than a 360° (full circle) rotation. In one embodiment, the wafer can be scanned linearly from one end of the wafer to the opposing end, e.g., via translation in a single direction. In one embodiment, a wafer can be scanned in a snake pattern.

Each acquisition can result in an array of spectral data corresponding to the intensity of each wavelength at each point in the FOV. The spectral data can be aggregated and analyzed to characterize the wafer. Advantageously, the hyperspectral broom camera can split the input light at each region on the wafer to acquire a full spectral response for the region. The method of the present disclosure thereby eliminates sensitivities, inconsistencies, and other issues that arise when spectral data for different wavelengths are acquired individually and then combined at a later time. In the present method, the broadband illumination beam can be a consistent beam, and the wafer can be scanned quickly via the movement of the handling stage for an efficient and high-throughput process. The movement of the wafer during the scan may not be a limiting factor in the system.

The wafer processing module 341 can include a processing chamber configured to perform a surface treatment on the sample 100, for example in vacuum. The surface treatment includes, but is not limited to, film deposition, etching, lithographic patterning, doping, cleaning, heating, chemical-mechanical polishing, etc.

The wafer processing module 341 can include a plasma processing chamber, which may be a capacitively-coupled plasma processing chamber, inductively-coupled plasma processing chamber, microwave plasma processing chamber, Radial Line Slot Antenna (RLSA™) microwave plasma processing chamber, electron cyclotron resonance (ECR) plasma processing chamber, or other types of processing systems or combination of systems. Thus, it will be recognized by those skilled in the art that the techniques described herein may be utilized with any of a wide variety of plasma processing systems. The plasma processing chamber can be used for a wide variety of operations including, but not limited to, etching, deposition, cleaning, plasma polymerization, plasma-enhanced chemical vapor deposition (PECVD), atomic layer deposition (ALD), atomic layer etch (ALE), and the like. The structure of a plasma chamber is well known to one skilled in the art. It will be recognized that different and/or additional plasma process systems may be implemented while still taking advantage of the techniques described herein.

In one embodiment, the apparatus 300 and the platform are used to perform multiple spectral measurements over the wafer surface. The resulting measurements can be used to interpolate over non-measured locations to generate a wafer map. In one embodiment, the wafer map can be transferred to the processing tool and be used by the processing tool to perform wafer processing operations based on characteristics of the wafer. In one example, the processing tool may selectively remove a portion of the top Si layer 124 to improve top Si layer thickness uniformity across the wafer.

The number of measurements can vary from e.g., 5 to upwards of 100,000 measurements (e.g., 5, 50, 100, 500, 1000, 5,000, 10,000, 100,000 and any values therebetween) per wafer. High measurement densities allow detection of the "imprint" of underlying structures and die edges in the wafer map, which allow measurement points to be registered to points within individual die.

In one embodiment, the apparatus 300 can further include a controller 343. Components of the apparatus 300 can be connected to and controlled by the controller 343 that may optionally be connected to a corresponding memory storage unit and user interface (all not shown). Various processing operations (e.g., spectrometer operations and plasma operations) can be executed via the user interface, and various processing recipes and operations can be stored in a storage unit. Accordingly, a given substrate can be processed within the aforementioned plasma chamber with various microfabrication techniques.

It will be recognized that the controller 343 may be coupled to various components of the apparatus 300 to receive inputs from and provide outputs to the various components, including, but not limited to, the light source 301, the illumination optical fiber 302, the KEP 303, system stops 305 and 331, the Schwarzschild objective 310, the handling stage 321, the wafer processing module 341, the beam splitter 333, a collection lens 335, a collection optical fiber 337 and/or the optical detector 339. For example, the controller 343 can be configured to receive data from the optical detector 339 to generate a wafer map based on the hyperspectral data. Such functions can be manually accomplished as well.

The controller 343 can also be configured to adjust knobs and control settings for these components. For example, the controller 343 can be configured to move and/or rotate the sample 100 by adjusting knobs and control settings for the handling stage 321. Such adjustments can be manually made as well. In one embodiment, the controller 343 can be configured to move and/or rotate the spectrometer by adjusting knobs and control settings for a spectrometer handling stage. In one embodiment, a scan pattern can be input to the controller 343 so that the wafer is automatically moved to each position for imaging. In one embodiment, the scan pattern can include positions of the handling stage 321 and timing of movement of the handling stage 321. In one embodiment, the scan pattern can include locations on the wafer to be scanned. For example, the controller 343 can receive an input of locations of interest of the sample. The controller 343 can then control the handling stage 321 so that the locations of interest are imaged by the spectrometer. In one embodiment, the controller 343 can use the locations of interest in characterizing the wafer after spectral data acquisition. In one embodiment, the controller 343 can correlate a position of the handling stage with a location on the wafer. In one embodiment, a location on the wafer can be defined according to a coordinate system.

The controller 343 can be implemented in a wide variety of manners. In one example, the controller 343 is a computer. In another example, the controller 343 includes one or more programmable integrated circuits that are programmed to provide the functionality described herein. For example, processing circuitry of one or more processors (e.g., microprocessor, microcontroller, central processing unit, etc.), programmable logic devices (e.g., complex programmable logic device (CPLD)), field programmable gate array (FPGA), etc.), and/or other programmable integrated circuits can be programmed with software or other programming instructions to implement the functionality of a proscribed plasma process recipe. It is further noted that the software or other programming instructions can be stored in one or more non-transitory computer-readable mediums (e.g., memory storage devices, FLASH memory, DRAM memory, reprogrammable storage devices, hard drives, floppy disks, DVDs, CD-ROMs, etc.), and the software or other programming instructions when executed by the programmable integrated circuits cause the programmable integrated circuits to perform the processes, functions, and/or capabilities described herein. Other variations could also be implemented.

Figure 5:
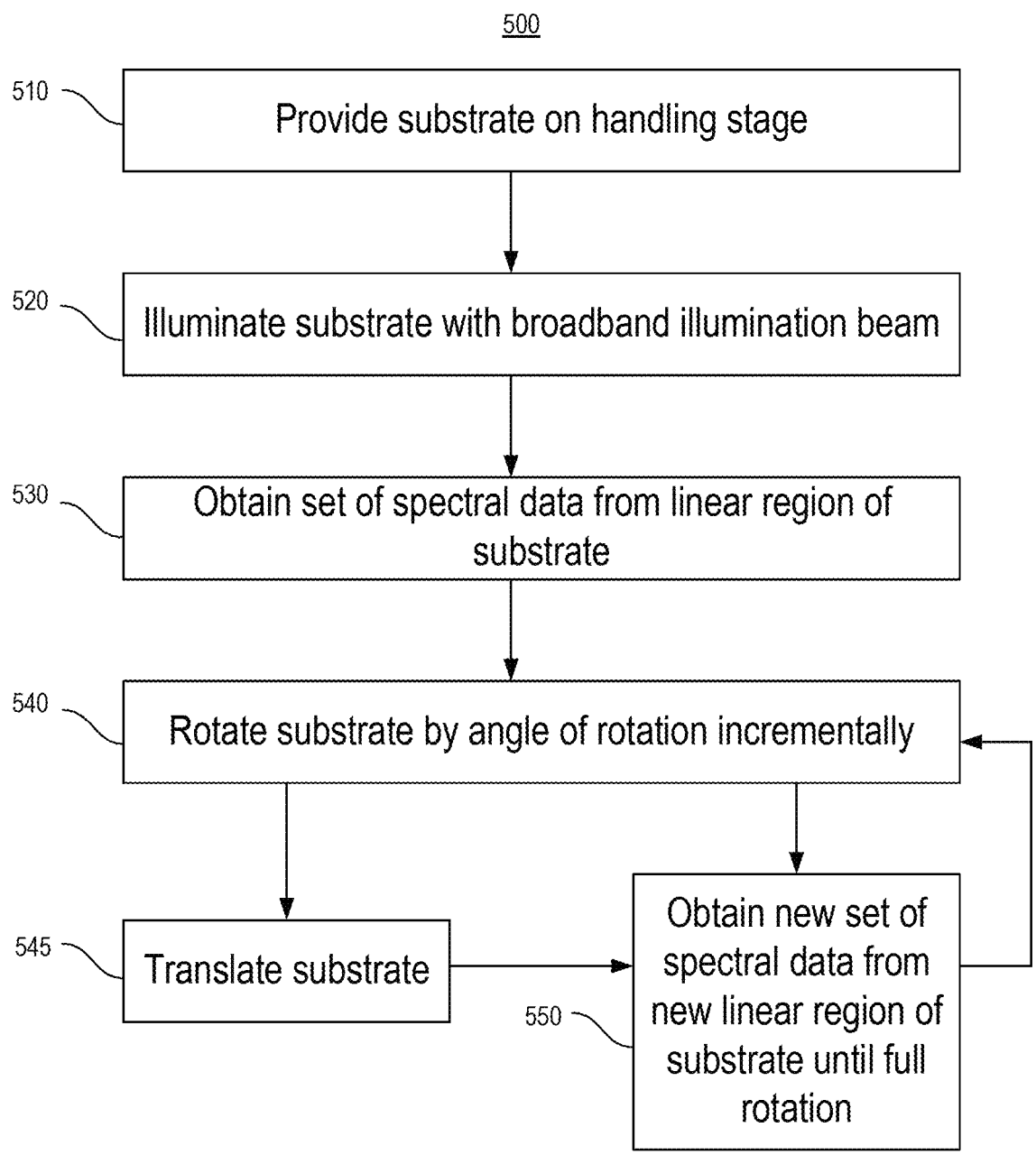
FIG. 5 is a flow chart of a process for wafer scanning, according to one embodiment of the present disclosure.

FIG. 5 is a flow chart of a process 500 for scanning and characterizing a substrate, according to one embodiment of the present disclosure. In step 510, the substrate can be provided on the handling stage. At step 520, the substrate can be illuminated with a broadband illumination beam. At step 530, the spectrometer can obtain a set of spectral data from a linear region of the substrate. At step 540, the substrate can be rotated by an angle of rotation. At step 550, the spectrometer can obtain a new set of spectral data from a new linear region of the substrate that is in the FOV of the spectrometer after the rotation. In one embodiment, steps 540 and 550 can be repeated as the substrate is incrementally rotated until the substrate is rotated in a full circle.

In one embodiment, the substrate can be translated in at least one direction in step 545 during the process 500. In one embodiment, the substrate can be translated in the at least one direction relative to the spectrometer in addition each incremental rotation and prior to obtaining a new set of spectral data from the substrate. In one example, the substrate can be scanned in a spiral pattern via the combination of rotation and translation. In one embodiment, the substrate can be rotated in more than one full circle while being translated in the spiral pattern.

In one embodiment, the substrate can be translated in at least one direction relative to the spectrometer after being rotated in a full circle. The substrate can then be rotated in a second full circle in the new position. In this manner, the substrate can be scanned in concentric circles.

The systems and methods described herein can increase the number of measurement points that are acquired from a substrate in an efficient manner. The hyperspectral broom camera can be used to obtain parallel measurements of a plurality of wavelength intensities at multiple locations in a region of a substrate. Movement of the substrate in a set scan pattern, as described herein, can result in the hyperspectral broom camera performing a full spectral scan of the substrate via repeated parallel measurements. Advantageously, the methods described herein do not require a fixed position of the sample or sequential scans over different illumination or collection wavelengths. The scan, as described herein, can be performed under constant illumination and collection conditions because the hyperspectral camera can determine individual wavelength responses from constant input light.

The metrology systems described herein can be used for thin and thick film measurements (e.g., measurement of films on bonded wafers), overlay measurements using specialized targets, including overlay of wafers during wafer-to-wafer bonding process, critical dimension measurements (e.g., on various types of diffraction gratings), and defect detection. The systems and methods described herein can also be used for high-throughput, repeatable optical metrology.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

"Substrate" or "wafer" as used herein generically refers to an object being processed in accordance with the invention. The substrate may include any material portion or structure of a device, particularly a semiconductor or other electronics device, and may, for example, be a base substrate structure, such as a semiconductor wafer, reticle, or a layer on or overlying a base substrate structure such as a thin film. Thus, substrate is not limited to any particular base structure, underlying layer or overlying layer, patterned or un-patterned, but rather, is contemplated to include any such layer or base structure, and any combination of layers and/or base structures. The description may reference particular types of substrates, but this is for illustrative purposes only.

The substrate can be any suitable substrate, such as a silicon (Si) substrate, a germanium (Ge) substrate, a silicon-germanium (SiGe) substrate, and/or a silicon-on-insulator (SOI) substrate. The substrate may include a semiconductor material, for example, a Group IV semiconductor, a Group III-V compound semiconductor, or a Group II-VI oxide semiconductor. The Group IV semiconductor may include Si, Ge, or SiGe. The substrate may be a bulk wafer or an epitaxial layer.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

Obviously, numerous modifications and variations of the present invention are possible in light of the above teachings. It is therefore to be understood that within the scope of the appended claims, the invention may be practiced otherwise than as specifically described herein.

The invention claimed is:

1. A method of measuring thin-film thickness, overlay, and wafer-to-wafer bonding overlay, comprising:
   providing a substrate on a handling stage configured for rotation;
   illuminating the substrate with a broadband illumination beam;
   obtaining a first set of reflectivity spectra of a first linear region of the substrate via a hyperspectral broom camera;
   incrementally rotating the substrate by an angle of rotation via the handling stage;
   obtaining a set of reflectivity spectra of a linear region of the substrate via the hyperspectral broom camera after each incremental rotation; and
   determining a thickness distribution of the substrate based on sets of reflectivity spectra obtained by the hyperspectral broom camera, wherein
   each set of reflectivity spectra includes individual intensities of a plurality of wavelengths of light.

2. The method of claim 1, further comprising incrementally translating the substrate in a first direction and a second direction relative to the hyperspectral broom camera in addition to each incremental rotation of the substrate and prior to obtaining each set of reflectivity spectra, the first direction and the second direction being perpendicular and in a plane of the substrate.

3. The method of claim 2, wherein the substrate is translated in at least one direction by the handling stage.

4. The method of claim 2, wherein the hyperspectral broom camera is translated in at least one direction by a linear stage.

5. The method of claim 1, further comprising linearly translating the substrate in at least one direction relative to the hyperspectral broom camera after the substrate is rotated in a full circle;
   incrementally rotating the substrate by the angle of rotation via the handling stage in a second full circle; and
   obtaining an additional set of reflectivity spectra of a linear region of the substrate via the hyperspectral broom camera after each incremental rotation in the second full circle.

6. The method of claim 5, wherein the substrate is linearly translated in the at least one direction by the handling stage.

7. The method of claim 5, wherein the hyperspectral broom camera is linearly translated in the at least one direction by a linear stage.

8. The method of claim 1, wherein each linear region of the substrate spans a radius of the substrate.

9. The method of claim 1, wherein each linear region of the substrate spans a diameter of the substrate.

10. A method of measuring thin-film thickness, overlay, and wafer-to-wafer bonding overlay, comprising:
    providing a substrate on a handling stage configured for rotation;
    illuminating the substrate with a broadband illumination beam;
    obtaining a first set of reflectivity spectra of a first linear region of the substrate via a hyperspectral broom camera;
    incrementally rotating the substrate by an angle of rotation via the handling stage;
    incrementally translating the substrate in a first direction and a second direction relative to the hyperspectral broom camera, the first direction and the second direction being perpendicular and in a plane of the substrate;
    obtaining a set of reflectivity spectra of a linear region of the substrate via the hyperspectral broom camera after each incremental rotation and translation; and
    determining a thickness distribution of the substrate based on sets of reflectivity spectra obtained by the hyperspectral broom camera, wherein
    each set of reflectivity spectra includes individual intensities of a plurality of wavelengths of light.

11. The method of claim 10, wherein the substrate is translated in at least one direction by the handling stage.

12. The method of claim 10, wherein the hyperspectral broom camera is translated in at least one direction by a linear stage.

13. An apparatus, comprising:
a handling stage configured to receive a substrate and to rotate;
a light source configured to emit a broadband illumination beam;
optics configured to guide the broadband illumination beam to the substrate and guide a reflected beam from the substrate to an hyperspectral broom camera, the optical detector being configured to obtain a set of reflectivity spectra from the substrate based on the reflected beam; and
a controller configured to:
obtain a first set of reflectivity spectra of a first linear region of the substrate via the hyperspectral broom camera,
incrementally rotate the substrate by an angle of rotation via the handling stage,
obtain a set of reflectivity spectra of a linear region of the substrate via the hyperspectral broom camera after each incremental rotation, and
determine a thickness distribution of the substrate based on sets of reflectivity spectra obtained by the hyperspectral broom camera, wherein
each set of reflectivity spectra includes individual intensities of a plurality of wavelengths of light.

14. The apparatus of claim 13, wherein the controller is further configured to incrementally translate the substrate in a first direction and a second direction relative to the hyperspectral broom camera in addition to each incremental rotation of the substrate and prior to obtaining each set of reflectivity spectra, the first direction and the second direction being perpendicular and in a plane of the substrate.

15. The apparatus of claim 14, wherein the controller is configured to translate the substrate in at least one direction via the handling stage.

16. The apparatus of claim 14, wherein the hyperspectral broom camera is coupled to a linear stage and the controller is configured to translate the hyperspectral broom camera in at least one direction via the linear stage.

17. The apparatus of claim 13, wherein the controller is further configured to modify a distance between the handling stage and the hyperspectral broom camera.

18. The apparatus of claim 13, wherein each linear region of the substrate spans a radius of the substrate.

19. The apparatus of claim 13, wherein each linear region of the substrate spans a diameter of the substrate.

20. The apparatus of claim 13, wherein the controller is further configured to linearly translate the substrate in at least one direction relative to the hyperspectral broom camera after the substrate is rotated in a full circle,
incrementally rotate the substrate by the angle of rotation via the handling stage until the substrate is rotated in a second full circle; and
obtain an additional set of reflectivity spectra of a new linear region of the substrate via the hyperspectral broom camera after each incremental rotation in the second full circle.

* * * * *